United States Patent
Matsumoto et al.

(10) Patent No.: US 8,693,481 B2
(45) Date of Patent: Apr. 8, 2014

(54) COMMUNICATION DEVICE

(75) Inventors: Noritaka Matsumoto, Tokai (JP);
Tsutomu Yamada, Hitachinaka (JP);
Kazuya Shimoyama, Hitachi (JP);
Yoshihito Sato, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 234 days.

(21) Appl. No.: 13/209,496

(22) Filed: Aug. 15, 2011

(65) Prior Publication Data

US 2012/0044954 A1 Feb. 23, 2012

(30) Foreign Application Priority Data

Aug. 20, 2010 (JP) ................................ 2010-184550

(51) Int. Cl.
*H04L 29/00* (2006.01)
(52) U.S. Cl.
USPC ......... 370/400; 370/437; 370/465; 455/432.2
(58) Field of Classification Search
None
See application file for complete search history.

(56) References Cited

U.S. PATENT DOCUMENTS

| | | | | |
|---|---|---|---|---|
| 5,497,373 | A | 3/1996 | Hulen et al. | 370/259 |
| 2005/0195735 | A1* | 9/2005 | Brady et al. | 370/216 |
| 2005/0212919 | A1* | 9/2005 | Chou | 348/211.2 |
| 2006/0153225 | A1 | 7/2006 | Kamiya | 370/463 |
| 2008/0212602 | A1* | 9/2008 | Hobbs et al. | 370/428 |
| 2010/0185742 | A1* | 7/2010 | Miyagi et al. | 709/206 |

FOREIGN PATENT DOCUMENTS

| | | |
|---|---|---|
| JP | 5-181657 | 7/1993 |
| JP | 11-017691 | 1/1999 |
| JP | 11-225171 | 8/1999 |
| JP | 2003-309581 | 10/2003 |
| JP | 2004-088768 | 3/2004 |
| JP | 2005-33295 | 2/2005 |
| JP | 2005-033296 | 2/2005 |
| JP | 2005-244237 | 9/2005 |
| JP | 2005-244273 | 9/2005 |
| JP | 2005-539456 | 12/2005 |
| JP | 2010-114746 | 5/2010 |
| WO | WO 2004/107683 | 12/2004 |

OTHER PUBLICATIONS

JP Office Action for JP Application No. 2010-184550, issued on Oct. 16, 2012.
Notice of Reasons for Rejection for Japanese Patent Application No. 2010-184550, issued on Oct. 16, 2012 with English translation.
Decision of Grant for Japanese Patent Application No. 2010-184550, issued on Jan. 8, 2013 with English translation.

* cited by examiner

*Primary Examiner* — Chi Pham
*Assistant Examiner* — Shick Hom
(74) *Attorney, Agent, or Firm* — Antonelli, Terry, Stout & Kraus, LLP.

(57) ABSTRACT

A communication device reduces a processing time required at the time of mutually converting different wireless or wired communication protocol and improves a real-time property. The communication device includes two or more communication units which communicate with two or more external devices and a communication controller which processes communication data. The communication controller has table information that associates a communication path, a type of the communication unit, and conversion-info, and an input and output unit that inputs and outputs the table information. According to the added conversion-info, a conversion unit sequentially performs various conversion processes (protocol conversion, routing, communication quality evaluation, fragmentation/integration of communication interface, fragment/ defragment process, frame multiplication/integration, and frequency setting).

6 Claims, 15 Drawing Sheets

FIG.2

| SOURCE IF INFORMATION | FINAL DESTINATION ADDRESS | NEXT DESTINATION ADDRESS | CONVERSION-INFO ID |
|---|---|---|---|
| A | 192.168.0.10 | 0xaaaa | 0x0001 |
| A | 192.168.0.10 | 0xabbbcc | 0x0002 |
| B | fe80 : : abcd | 0x112233 | 0x0003 |
| C | 0x03 | 0x112233 | 0x0004 |

| CONVERSION-INFO ID 24 | OUTPUT IF 31 | IF INTEGRATION 32 | MULTIPLE IF 33 | QUALITY INFORMATION 34 | CHANNEL INFORMATION 35 | CONVERSION PATTERN 36 | FRAGMENT INFORMATION 37 | MULTIPLICATION/ INTEGRATION NUMBER 38 | RETRY NUMBER 39 | RETRY WAITING TIME 40 |
|---|---|---|---|---|---|---|---|---|---|---|
| 0x0001 | C | 0 | 0 | 1 and 2 | 11 | A ⇒ C | 100Byte | 3 ⇒ 1 | 5 | 5ms |
| 0x0002 | B | 0 | 0 | 1 and 2 | 3 | A ⇒ B | 300Byte | 3 ⇒ 1 | 5 | 10ms |
| 0x0003 | A | 1 | 0 | 1 and 3 | 1 | B ⇒ A | 500Byte | 1 ⇒ 3 | 2 | 1ms |
| 0x0004 | A | 1 | 0 | 2 | 1 | C ⇒ A | 500Byte | 1 ⇒ 3 | 2 | 1ms |

CONVERSION-INFO 30

| QUALITY INFORMATION | EVALUATION METHOD |
|---|---|
| I | RSSI MEASUREMENT |
| II | PER MEASUREMENT |
| III | BER MEASUREMENT |

| SOURCE IF INFORMATION | FINAL DESTINATION ADDRESS | NEXT DESTINATION ADDRESS | CONVERSION-INFO ID |
|---|---|---|---|
| COMMUNICATION UNIT A | 192. 168. 0. 10 | 0xaaaa | 0x0011 |
| COMMUNICATION CONTROLLER Y | fe80 : : abcd | 0x112233 | 0x0012 |
| COMMUNICATION UNIT B | fe80 : : accc | 0x445566 | 0x0013 |

(b)

| SOURCE IF INFORMATION | FINAL DESTINATION ADDRESS | NEXT DESTINATION ADDRESS | CONVERSION-INFO ID |
|---|---|---|---|
| COMMUNICATION UNIT B | 192. 168. 0. 20 | 0xbbbb | 0x0101 |
| COMMUNICATION CONTROLLER X | 192. 168. 0. 10 | 0xaaaa | 0x0102 |
| COMMUNICATION UNIT C | fe80 : : abcd | 0x112233 | 0x0103 |

COMMUNICATION DEVICE

INCORPORATION BY REFERENCE

The present application claims priority from Japanese application JP 2010-184550 filed on Aug. 20, 2010, the content of which is hereby incorporated by reference into this application.

BACKGROUND OF THE INVENTION

The present invention relates to a communication device used in a communication system such as Internet/Intranet, wireless Local Area Network (LAN), cellular phone, sensor network, and Radio Frequency IDentification (RFID), and more particularly, to a communication device to relay data between different networks.

Known is technology of communicating with a counterpart by using multiple wired or wireless communication technologies. In the above-described technology, a program to mutually convert data is prepared between specific communication methods, and can connect different communication devices to each other.

In conventional technology disclosed in JP-A-2005-033295 and JP-A-H05-181657, for example, the same or different multiple communication interfaces are connected to a central processing unit (CPU), for example, via a bus.

When performing routing between the same communication interfaces, data is processed via a memory connected to a CPU by using a direct memory access (DMA). In case of communication between different interfaces, a communication protocol is converted by software, and then routing processing is performed.

SUMMARY OF THE INVENTION

However, since a process is composed of mainly software through a CPU or memory in conventional technology, a real-time property is hard to be assured.

For improving reliability of communication, since functions need to be implemented by software or hardware for each communication interface or communication protocol, it has been difficult to cope with various types.

Further, an application using a current radio communication technology, such as wireless metropolitan area network technology or a fourth generation mobile phone technology will become popular in the future. At the thought of the above-described conditions, each exclusive communication device is not desired to be prepared for multiple applications also from the viewpoint of development costs of hardware and software.

In view of the foregoing, it is an object of the present invention to provide a communication device in different wireless/wired networks, specifically, capable of performing routing data transmitted and received by different communication devices and communication protocols with high reliability and in real-time.

According to one aspect of the present invention, this communication device has two or more communication units to communicate with two or more external devices, and has at least one of communication control functions of processing communication data.

The communication control function has table information that associates a communication path, a type of communication unit, and information for data conversion (hereinafter, referred to as conversion-info); a decision function that decides a communication path and a type of communication unit; a conversion function that converts a data format to correspond to the communication unit, and decides the operation by decision results from the decision function and the table information; and a function to add conversion-info that adds conversion-info relating to the communication device's operation included in the table information to the data acquired by the communication unit.

Further, the conversion-info of the table information may be another table information associated with a conversion-info ID.

According to another aspect of the present invention, this communication device includes two or more communication units to communicate with two or more external devices, and a communication controller to process communication data, wherein the communication controller has table information that associates a communication path, a type of communication unit, and conversion-info. Further, this communication controller has a decision unit that decides the communication path and a type of the communication unit; a conversion unit that converts into a data format corresponding to the communication unit, and decides an operation from decision results of the decision unit and the table information; and a unit to that adds conversion-info to add conversion-info relating to operation processing of the table information to data acquired by the communication unit.

In addition, the decision unit confirms a communication path and a type of communication unit, and decides whether data received by the communication unit is to be processed by this communication controller.

Further, the decision unit preferably extracts at least a part of data acquired by the communication unit in a format corresponding to a type of the communication unit, and parallelizes the extracted data.

In short, when multiple types of formats corresponding to the communication units are present with respect to data acquired by the communication units, a preferable format is selected from among these formats.

Further, the conversion unit preferably decides a conversion method of data based on the conversion-info, and sequentially performs the conversion process to be selected.

Further, as a change method of the table information, when the communication unit is newly connected, the newly-connected communication unit preferably has conversion-info (may be meta information) of its own, and updates table information based on the conversion-info of its own.

Further, as a change method of the table information, when a communication unit is newly connected, the conversion-info to connect the previously-connected communication units and the newly-connected communication unit to each other is preferably acquired from external devices via the communication units, and the table information is updated based on the acquired conversion-info.

According to yet another aspect of the present invention, this communication device includes two or more communication units to communicate with two or more external devices; and a storage unit to have a communication control function of processing communication data. The storage unit has table information that associates a communication path, a type of communication unit, and conversion-info; a decision program that decides the communication path and a type of the communication unit; a conversion program that converts into a data format corresponding to the communication unit and decide an operation from decision results of the decision program and the table information; and a program that adds conversion-info to add conversion-info relating to operation processing of the table information to data acquired by the communication units.

The above-described communication control functions are executed as programs of a CPU, and the table information is held as a database of the storage unit. Further, each program is implemented as an execution object of programs.

Further, the communication control function can also be expanded by update of these programs.

According to yet another aspect of the present invention, this communication device includes two or more communication units to communicate with two or more external devices; two or more communication controllers to process communication data; and a storage unit, wherein the storage unit has table information that associates a communication path, a type of the communication unit, and conversion-info; the communication controller includes a decision unit that decides a communication path and a type of the communication unit, a conversion unit that converts into a data format corresponding to the communication unit, and decides an operation from decision results of the decision unit and the table information, and a unit that adds conversion-info to add conversion-info relating to operation processing of the table information to data acquired by the communication unit; and when data acquired from the communication unit is processed via the two or more communication controllers, the data is mutually transmitted and received by the two or more communication units.

According to yet another aspect of the present invention, this communication device further includes two or more communication controllers, wherein the communication units and the two or more communication controllers are connected to each other via a bus; the table information each associates different types of communication paths, multiple types of communication units, and conversion-info; and when data acquired from the communication units is processed via at least one of the communication controllers, the data is mutually transmitted and received by the two or more communication units.

According to yet another aspect of the present invention, this communication device further includes two or more communication controllers, wherein the communication unit is directly connected to any one of the communication controllers, and the communication controller is directly connected to the communication unit or other communication controllers; the table information each associates different types of communication paths, multiple types of communication units, and conversion unit; and when data acquired from the communication units is processed via at least one of the communication controllers, the data is mutually transmitted and received by the two or more communication units.

As can be seen from the above discussion, when using existing assets and general-purpose components, the communication device described in the present embodiments can be connected between different networks at low cost.

Further, in the communication device described in the present embodiments, the communication controller preferably has a unit to input and output table information so as to download table information from the CPU.

Further, a communication system can be built in which the above-described communication devices are connected to each other via different networks (communication units) and mutually transmit and receive data.

According to the present invention, there can be provided a communication device capable of performing routing data transmitted and received with high reliability and in real-time in different wireless/wired networks, namely, by different communication devices and communication protocols.

Other objects, features and advantages of the invention will become apparent from the following description of the embodiments of the invention taken in conjunction with the accompanying drawings.

BRIEF DESCRIPTION OF THE DRAWINGS

FIG. 2 illustrates one example of a configuration of a corresponding-table according to the first embodiment of the present invention;

FIG. 3 illustrates one example of a configuration of conversion-info according to the first embodiment of the present invention;

FIG. 13 illustrates one example of a configuration of the corresponding-table according to the third embodiment of the present invention;

DESCRIPTION OF THE EMBODIMENTS

Embodiments of the present invention will be described below.

First Embodiment

A first embodiment of the present invention will be described in detail below with reference to the accompanying drawings.

Figure 1:
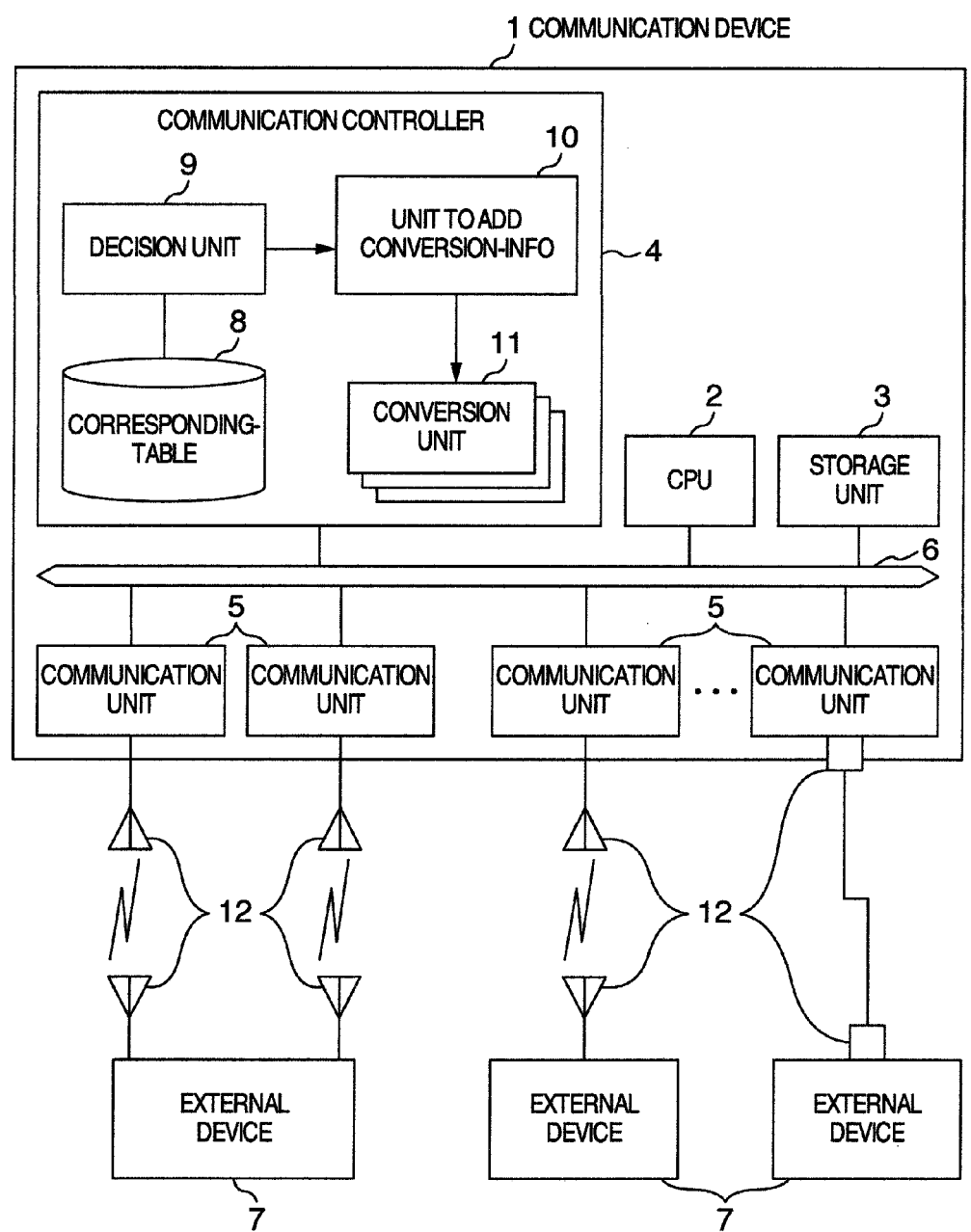
FIG. 1 illustrates an outline of a communication system to which a communication device is applied according to a first embodiment of the present invention.

FIG. 1 illustrates an outline of a communication system to which a communication device is applied according to the first embodiment of the present invention.

The illustrated communication device 1 includes a CPU 2, a storage unit 3, a communication controller 4, and a communication unit 5.

The CPU 2, the storage unit 3, the communication controller 4, and the communication unit 5 are connected to each other via a bus 6 of a parallel connection or serial connection. Examples of the bus 6 include a peripheral component interconnect (PCI) and a universal serial bus (USB).

The CPU 2 has a function of reading out a program from the storage unit 3 and executing it, and a function of transmitting and receiving data to and from the communication unit 5 and the communication controller 4.

The storage unit 3 has a function of storing data transmitted and received by the communication unit 5 and data processed by the CPU 2, and examples of the storage unit 3 include nonvolatile memory and volatile memory.

The CPU 2 and the storage unit 3 may be directly connected without the bus 6.

The communication unit 5 has a communication interface 12, and has a function of being each connected by wire or wirelessly to an external device 7 having the communication interface 12, by using a communication protocol, and communication method corresponding to the communication unit 5, and performing data communication.

The communication unit 5 has a function of a data link layer and physical layer specified, for example, by IEEE 802.11, IEEE 802.15.1, and IEEE 802.15.4.

At least two or more communication units 5 are connected, and they may be the same type or different type.

The communication interface 12 has a function of connecting the communication device 1 and the external device 7 via a network. For example it's an antenna in case of the wireless connection, and it's a connector in case of the wired connection.

In addition, one communication unit 5 may have two or more communication interfaces 12.

The communication controller 4 has a function of inputting received data received by the communication unit 5 as input data, processing it according to the after-mentioned process flow, and then outputting transmit data transmitted by the communication unit 5 as output data.

The communication controller 4 is configured by table information 8 (hereinafter, referred to as a corresponding-table 8) which associates a communication path, conversion-info, and types of the communication unit of data, a decision unit 9, a unit to add conversion-info 10, and a conversion unit 11.

The corresponding-table 8 is table data which associates information on a communication path such as a source address or destination address included in data received by the communication unit 5, conversion-info, and types of the communication unit 5 (e.g., types of communication units whose protocol or communication methods is different).

The conversion-info is information in which defined is a method for converting one data format or communication method into another data format or communication method at the time of transmitting data received from a certain communication unit 5 by another communication unit 5.

The communication controller 4 is formed on one chip (semiconductor element) as in hardware. This permits the communication controller 4 to convert data at high speed.

When a communication unit 5 is newly added to the bus 6, the newly-added communication unit 5 can update the table information 8 based on the conversion-info of its own. Alternatively, the communication unit 5 can acquire the conversion-info to connect the previously-connected communication unit 5 and the newly-connected communication unit 5 to each other from the external device 7 via the communication unit 5, and update the table information 8.

Since the communication controller 4 is directly connected to the bus 6, data produced from the communication unit 5 is directly supplied to the corresponding-table 8.

FIG. 2 illustrates one example of a configuration of the corresponding-table according to the first embodiment of the present invention.

As illustrated in FIG. 2, the corresponding-table 8 is configured by information (source interface (IF) information 21) to identify the communication interface 12 which receives data or the communication unit 5, a final destination address 22, next destination address 23 of data, and a conversion-info ID 24 related to the conversion-info 30.

The final destination address 22 is a final destination of data, and examples of it include an Internet Protocol (IP) address of a network layer in IP network.

Further, the next destination address 22 represents an address of next hop in the case of performing data communication, so-called, multi hop communication via the two or more communication devices 1. Examples of it include a media access control (MAC) address of a data link layer in IP network.

As illustrated in FIGS. 2 and 3, examples of the conversion-info ID 24 include identification data to derive the conversion-info 30.

In FIG. 2, information described in an item of the source IF information 21 represents a type of the communication unit. Further, by information described in the items of the final destination address 22 and the next destination address 23, the communication path is decided. The conversion-info ID 24 is identification (ID) data representing a relationship between itself and the conversion-info.

FIG. 3 illustrates one example of a configuration of the conversion-info according to the first embodiment of the present invention.

FIG. 3 illustrates an example in which the conversion-info 30 is defined in the case where the conversion-info ID 24 is 0x0001 to 0x0004.

Here, a configuration of the corresponding-table 8 no needs to be as illustrated in FIG. 2. If a corresponding relationship between a communication path (source and destination) and conversion unit of data is definite, any format is available. In place of the source IF information 21, for example, an address of a data source may be used. Further, in place of the conversion-info ID 24, the conversion-info 30 may be directly included in the corresponding-table 8.

The decision unit 9 has a function of analyzing data received by the communication unit 5, and deciding whether data is to be processed by the communication controller 4.

Details of a process flow of the decision unit 9 will be described later.

The unit to add conversion-info 10 is a method to add the conversion-info 30 or the conversion-info ID 24 to data received by the communication unit 5.

Figure 4:
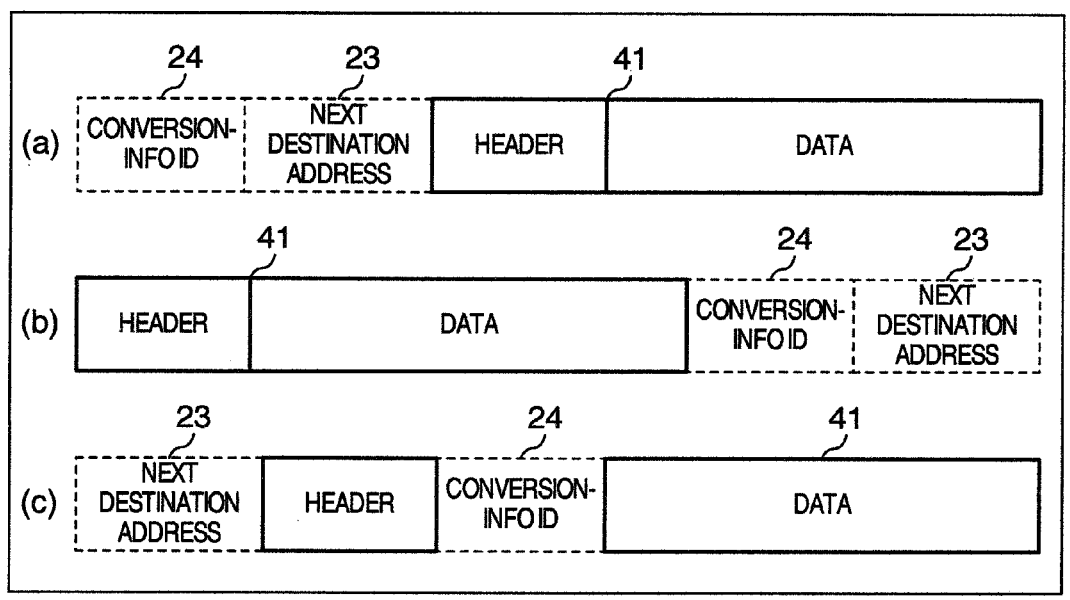
FIG. 4 illustrates one example in which a conversion-info ID is added to a data frame according to the first embodiment of the present invention.

FIG. 4 illustrates one example in which the conversion-info ID 24 is added to a data frame according to the first embodiment of the present invention.

As illustrated in FIG. 4A, for example, the conversion-info ID 24 or the next destination address 23 may be added to a head of a data frame 41. Further, as illustrated in FIG. 4B, the conversion-info ID 24 or the next destination address 23 may be added to an end of the data frame 41. As illustrated in FIG. 4C, the conversion-info ID 24 and the next destination address 23 may be separated and added to the head of the data frame 41 or the position between the header and the data.

Further, not only the conversion-info 30 and the conversion-info ID 24 but also a part of information on the corresponding-table 8, for example, the next destination address 23 may be added.

Further, there may be adopted a method for not directly adding information to the data frame 41, but storing it in a memory and sequentially referring to it during the data processing.

Further, in place of adding the conversion-info 30 to data, a method for deciding a process of a conversion method, or unit, 11 may be adopted by using a method for previously performing parameter setting to the after-mentioned conversion unit 11.

The conversion unit 11 has a function of converting data into a predetermined format, and generating or updating data such as a parameter necessary for conversion of the data format.

As the conversion unit 11, multiple types and pieces of it may be used.

Further, the conversion unit 11 may have, for example, a function of evaluating quality of communication (received signal strength indicator (RSSI), packet error rate (PER), and bit error rate (BER)), setting a channel of communication from the evaluated quality of communication, integrating input data input by two or more communication methods, or units, 5 into one data, fragmenting input data input by one communication unit 5 into output data to two or more communication units 5, converting data (protocol) between a certain communication unit 5 and a different communication unit 5, fragmenting large-sized data into multiple small-sized data, defragmenting multiple small-sized data into large-sized data, multiplying one data in order to improve reliability of data communication, defragmenting multiplied data into one data, and routing a communication path.

Figure 5:
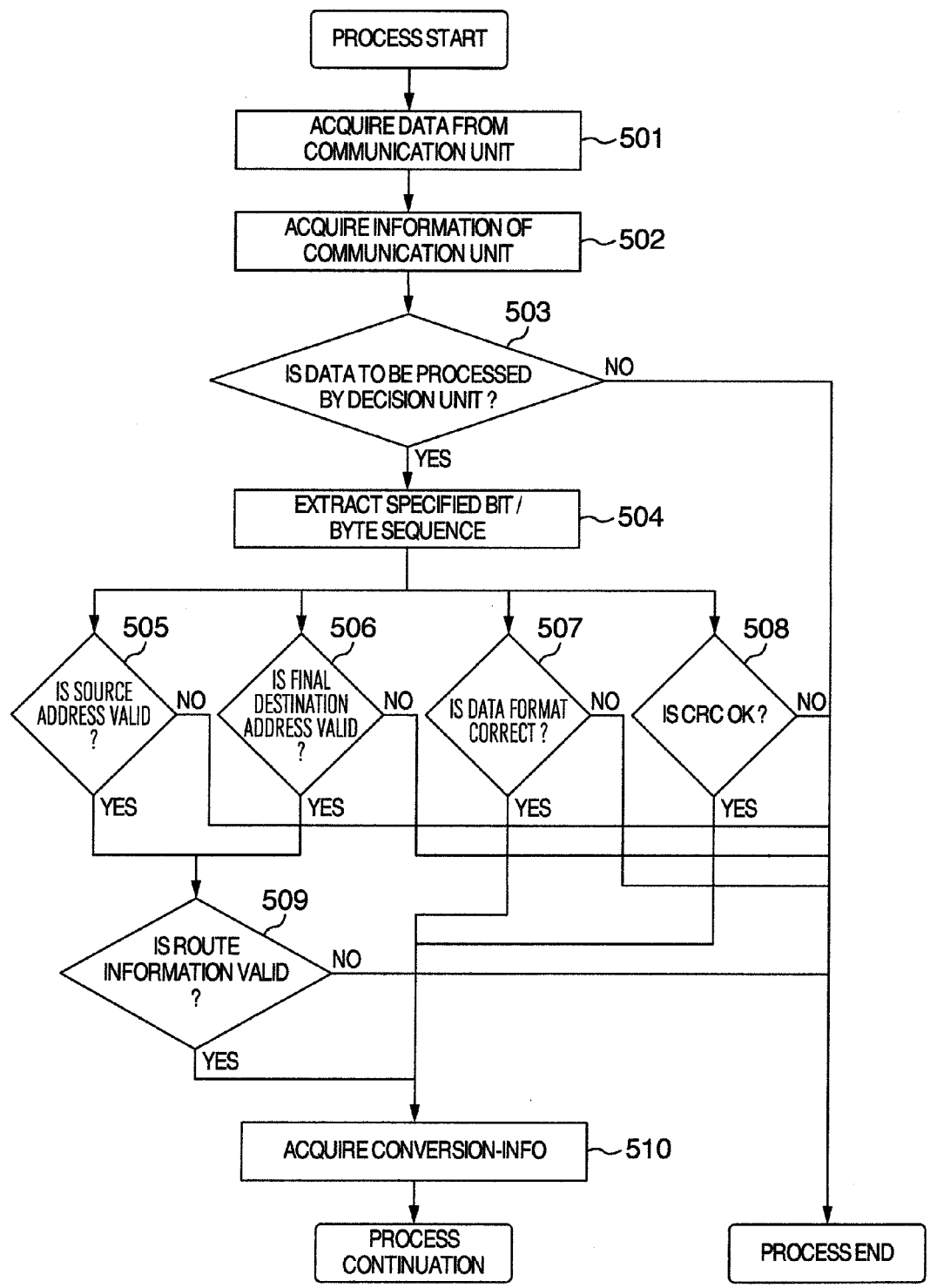
FIG. 5 illustrates a flowchart relating to operations of a decision unit according to the first embodiment of the present invention.

FIG. 5 illustrates a flowchart relating to operations of a decision method, or unit, according to the first embodiment of the present invention.

FIG. 5 illustrates a process flow in the decision unit 9.

First, the decision unit 9 acquires data from the communication unit 5 (step 501).

As a method for acquiring data from the communication unit 5, the following methods are used.

A method is used in which predetermined setting for performing communication with the communication controller 4 is previously performed with respect to the communication unit 5 and the CPU 2, and the communication unit 5 and the communication controller 4 directly perform communication with each other.

In addition, a method is used in which the communication unit 5 performs communication with the CPU 2 without recognizing the presence of the communication controller 4. In this case, the communication unit 5 reads data to be transmitted to the CPU 2 and the communication controller 4 decides as data to be processed by itself. At this time, the communication controller 4 notifies the CPU 2 of interrupt, and when the CPU 2 leaves a process to the communication controller 4, a communication holds.

Further, as a data acquisition source, the decision unit 9 may acquire data not from the communication unit 5 but from the CPU 2.

Next, the decision unit 9 acquires information (e.g., identification data, types, and connection positions) relating to the communication unit 5 which acquires data (step 502).

The decision unit 9 may decide information relating to the communication unit 5 based on contents of the acquired data.

Alternatively, the decision unit 9 may acquire the connection positions on the bus 6 as hardware information, and acquire identification data of the communication unit 5 from this hardware information.

Next, based on the acquired information relating to the communication unit 5 in step 502, the decision unit 9 decides whether the acquired data is data to be processed by itself (step 503).

If deciding that the data is to be processed, the decision unit 9 extracts a specified bit or byte sequence from among data (step 504).

Next, the decision unit 9 performs the decision processing corresponding to the extracted bit/byte sequence at the same time (steps 505 to 508). For example, the following processes are performed.

The decision unit 9 decides whether a source address of data is valid (step 505). The decision unit 9 decides whether the final destination address 22 of data is valid (step 506). As a decision method, for example, the decision unit 9 may decide the above based on whether the relevant address is stored in the corresponding-table 8, or based on a general routing table.

Further, the decision unit 9 decides whether the data format is correct (step 507). In addition, the decision unit 9 decides whether an error-detecting code such as a cyclic redundancy check (CRC) is matched with each other (step 508).

Note that the decision processing incapable of being performed at the same time may be divided into several stages.

Next, when both of the source address and the final destination address are stored in the corresponding-table 8 or the routing table, the decision unit 9 decides whether valid route information is present (step 509).

The valid route information represents, for example, whether the final destination to the source of data is uniquely decided by the corresponding-table 8 or the routing table.

If No in each decision processing (steps 505 to 508), the decision unit 9 ends the process of the communication controller 4. When ending the process, the decision unit 9 may discard data, or transfer it to the CPU 2 and leave subsequent processes to the CPU 2. For example, when the final destination address 22 of data is an address of the communication device 1, the decision unit 9 may leave the subsequent processes to the CPU 2.

If Yes, the decision unit 9 acquires the conversion-info 30 or the conversion-info ID 24 from the corresponding-table 8 (step 510).

For continuing the process, the decision unit 9 then moves to the after-mentioned process flow.

Figure 6:
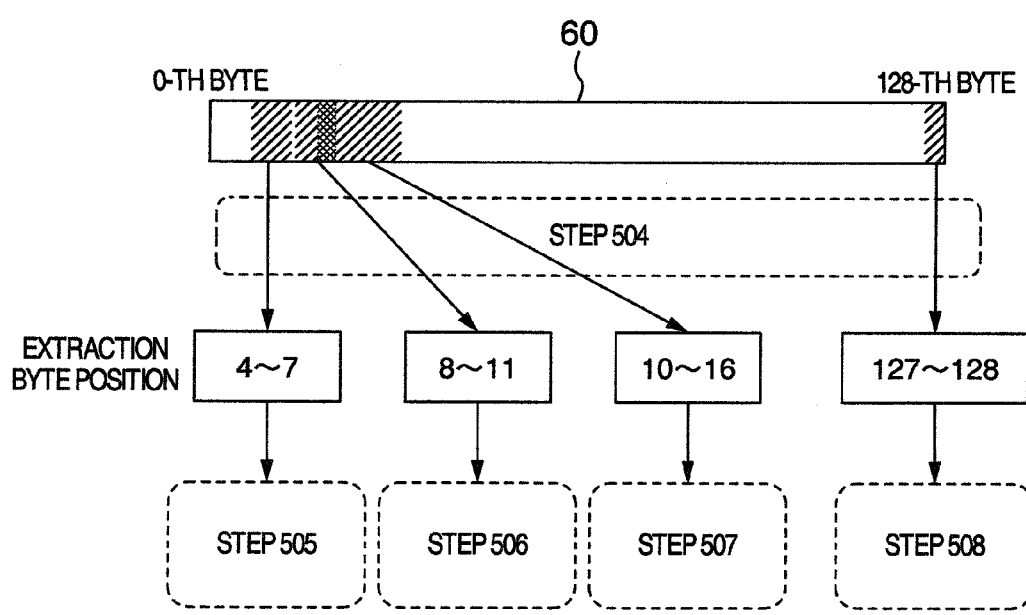
FIG. 6 illustrates one example in which a specified bit/byte sequence of the decision unit is extracted according to the first embodiment of the present invention.

In step 504, as illustrated in FIG. 6, for example, the decision unit 9 takes out the bit/byte sequences of multiple parts at the same time.

FIG. 6 illustrates one example in which the specified bit/byte sequences are extracted by the decision unit 9 according to the first embodiment of the present invention.

In step 504, the decision unit 9 extracts extraction byte positions corresponding to predetermined steps 505, 506, 507, and 508 in the data (data frame) 60.

Further, a type of the process different from the above-described process also is used. For example, even if two processes are the same process, the extraction byte positions may be different or types of the processes may be different.

The decision unit 9 can extract data by a format corresponding to a type of the communication unit 5 as described above, and parallelize the extracted data.

Here, a pattern of the taken bit/byte sequence is changed according to a type of the communication unit 5. Further, multiple positions of the taken bit/byte sequences may be different from each other, or repeated.

In addition, after deciding the data format, the decision unit 9 may extract a bit/byte sequence necessary for another decision processing again.

Figure 7:
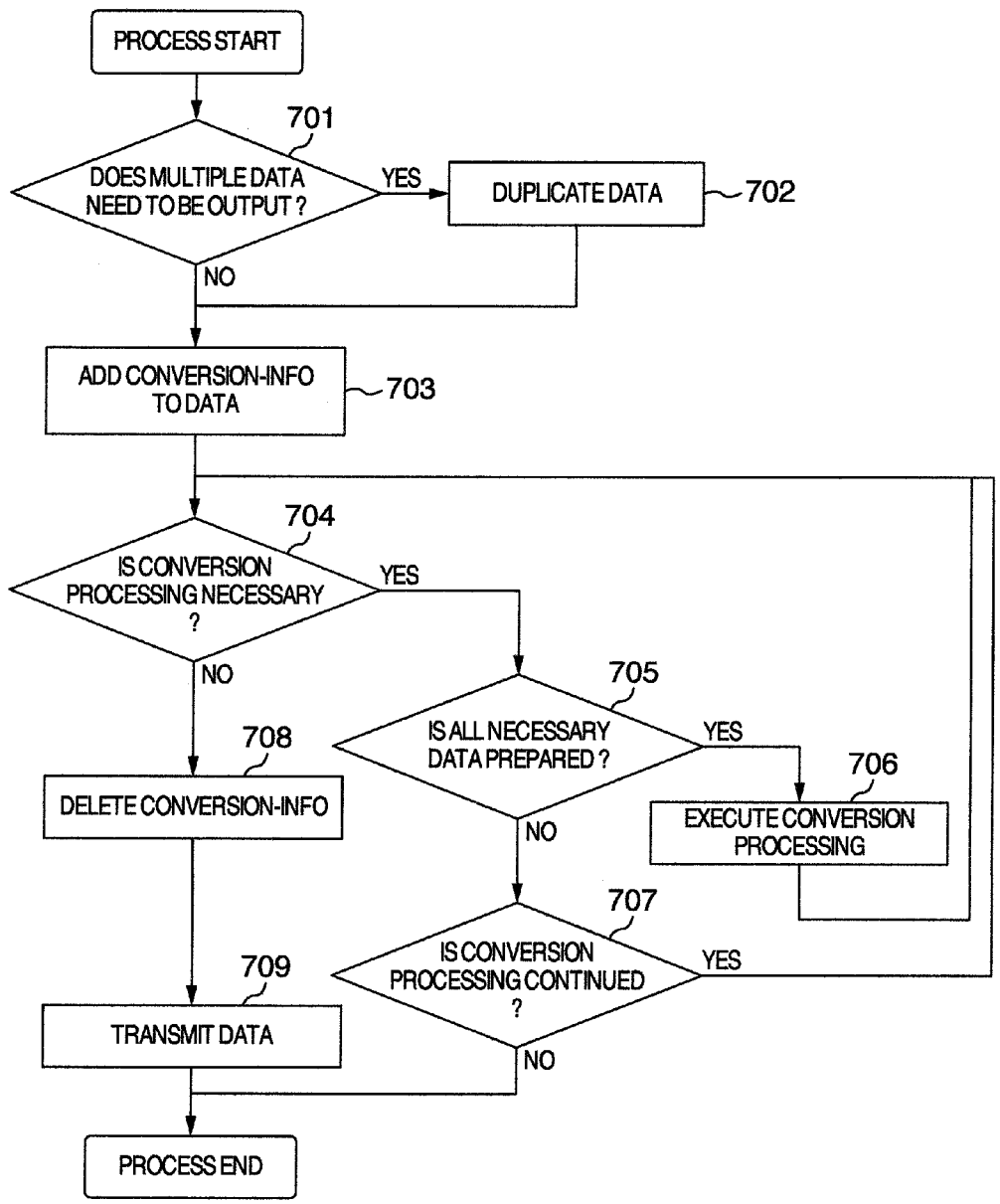
FIG. 7 illustrates a flowchart relating to operations of a communication controller according to the first embodiment of the present invention.

FIG. 7 illustrates a flowchart relating to operations of the communication controller 4 according to the first embodiment of the present invention.

FIG. 7 illustrates a process flow in the case where the decision unit 9 decides the process as a process continuation.

First, the communication controller 4 decides whether the acquired data needs to be transmitted (output) by using two or more communication units 5 (step 701).

When two or more communication units 5 need to be used, the communication controller 4 duplicates data by the necessary number of data (step 702).

Next, the communication controller 4 adds to data the conversion-info 30 or conversion-info ID 24 acquired in step 510 of the decision unit 9 (step 703).

Here, when duplicating data in step 702, the communication controller 4 adds the above-described information to each data. Examples of the conversion-info 30 include information as illustrated in FIG. 3. In place of the conversion-info 30, the conversion-info ID 24 may be used. In this case, as illustrated in FIGS. 2 and 3, for example, the conversion-info ID 24 needs to correspond to the conversion-info 30 on one-on-one level.

FIG. 3 illustrates one example of a configuration of the conversion-info according to the first embodiment of the present invention.

FIG. 3 illustrates one example of a configuration of the conversion-info 30.

The output IF 31 represents identification data from the communication unit 5 and communication interface 12 which output data.

The IF integration 32 represents flag information to integrate data produced from two or more communication units 5 or communication interfaces 12 and represent whether to treat the integrated data as one data.

The multiple IF 33 represents flag information indicating whether to transmit one data by using two or more communication units 5 or communication interfaces 12.

When both of the IF integration 32 and the multiple IF 33 indicate validity, they represent integrating data produced from the two or more communication units 5 or communication interfaces 12 once, and then outputting the integrated data by using the two or more communication units 5 or communication interfaces 12 again.

The flag information of the multiple IF 33 does not need to be included. In this case, in the corresponding-table 8, for example, when the different next destination address 23 is registered with respect to the same final destination address 22, the communication controller 4 can decide that the two or more communication units 5 or communication interfaces 12 are necessary.

The information of quality 34 represents information to specify a reference value or evaluation method for evaluating link quality between the predetermined communication device and another communication device when performing communication wirelessly. For example, evaluation is performed by received signal strength, signal/noise (S/N) ratio, packet error rate (PER), and bit error rate (BER).

The channel information 35 represents information to set a channel of communication or frequency to be used when performing communication wirelessly.

The conversion pattern 36 represents information to specify a data frame conversion method and a communication protocol conversion method in the case where data is exchanged between the predetermined communication unit 5 and the communication unit 5 different therefrom in the data frame and the communication protocol.

The fragment information 37 represents information to decide whether to fragment one large-sized data into how many small-sized data or whether to fragment one large-sized data into how large-sized data when fragmenting one large-sized data into small-sized data. On the contrary, the above-described information may be used to decide whether to defragment how many small-sized data into one large-sized data or whether to defragment how large-sized data into one large-sized data when defragmenting small-sized data into one large-sized data.

The multiplication/integration number 38 represents information to multiply one data to how many multiplication levels for transmission, or decide that data multiplied to how many multiplication levels is defragmented and treated as one data.

The retry number 39 represents information to decide that how many times data is retried in the case where acknowledgment cannot be performed by data acknowledgment transmission reception, namely, data fails to be transmitted during the data transmission.

The retry waiting time 40 represents information to decide a retry waiting time until waiting for a response of the data acknowledgment in the retry processing.

Note that the conversion-info 30 does not need to have all of the above-described data. Further, information related to the data conversion may be added except for the data.

In step 702, when duplicating the data, the communication controller 4 may add the same conversion-info 30 or conversion-info ID 24 to each data, or the different conversion-info 30 or conversion-info ID 24 to each data. Suppose, however, that they are pursuant to the corresponding-table 8.

The communication controller 4 performs all processes in step 703 or in subsequent steps for each data. That is, the communication controller 4 can parallelize multiple data.

The communication controller 4 decides whether conversion process is necessary for data based on the added conversion-info 30 (step 704).

When the conversion process is necessary for data, the communication controller 4 decides whether all of the data necessary for the conversion process is prepared (step 705).

When all of the necessary data is prepared, the communication controller 4 executes the predetermined conversion process (step 706).

The communication controller 4 then returns to step 704, and again decides whether other conversion processes are necessary for the data.

When all the data necessary for the conversion process is not prepared and the time out occurs in step 705, the communication controller 4 decides whether the conversion process is continued (step 707).

If deciding that continuation of the conversion process is unnecessary, the communication controller 4 ends the process.

If deciding that continuation of the conversion process is necessary, the communication controller 4 returns to step 704 and again decides whether other conversion processes are necessary.

Here, the communication controller 4 processes the processes of steps 704 to 707 referring to the conversion-info 30.

If the other conversion processes are unnecessary (all the necessary conversion processes are completed), the communication controller 4 deletes the added conversion-info 30 or conversion-info ID 24 (step 708), and transmits the data by using the predetermined communication unit 5 (step 709).

Figure 8:
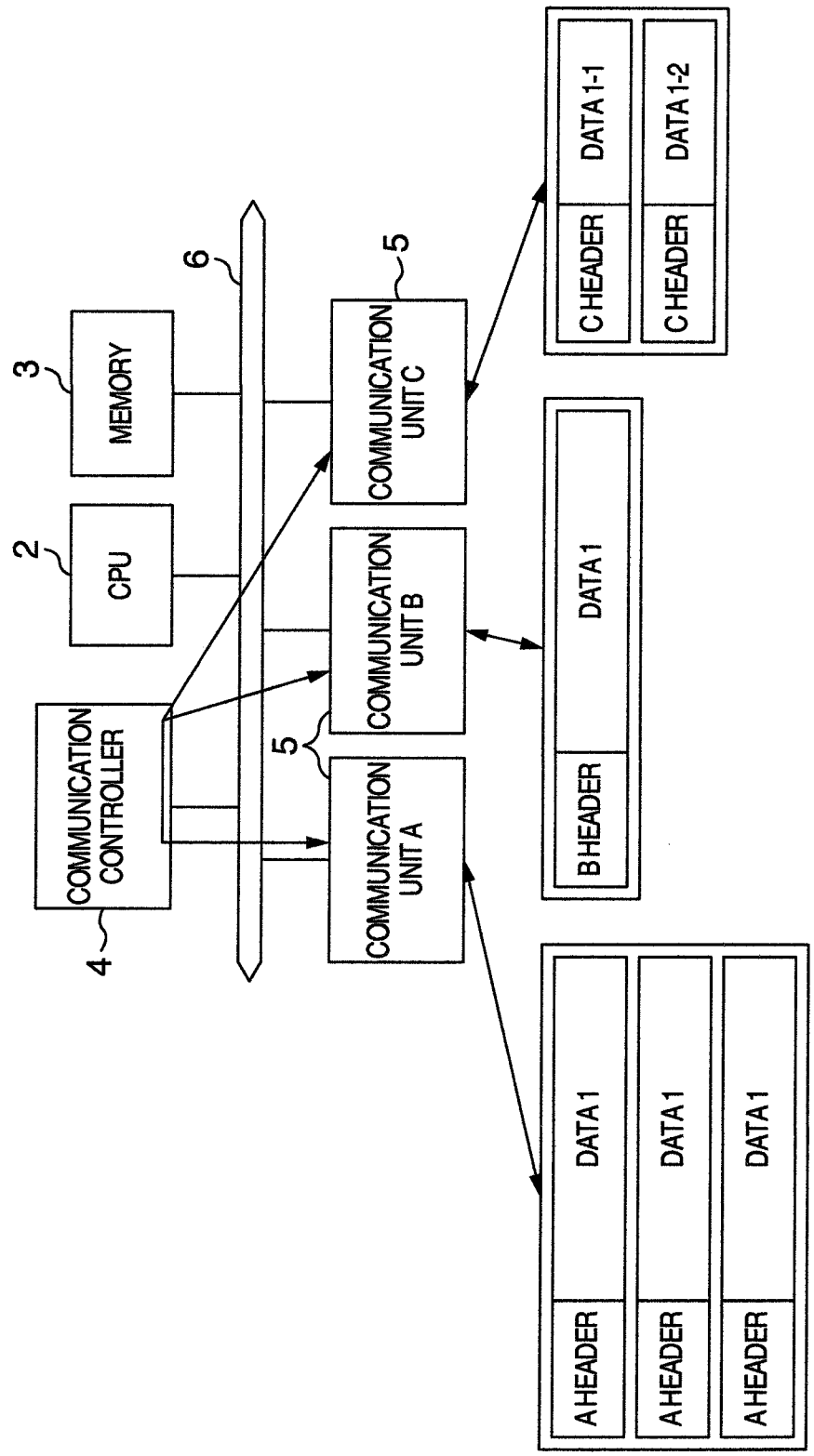
FIG. 8 illustrates a configuration and data flow of the communication device according to the first embodiment of the present invention.

FIG. 8 illustrates a configuration and data flow of the communication device according to the first embodiment of the present invention.

As illustrated in FIG. 8, specific processes of the communication controller 4 will be described by using as an example the communication device 1 having a configuration in which the communication units 5A, 5B, and 5C are connected.

Here, data acquired by the communication unit 5A is assumed to be output from the communication units 5B and 5C via the communication controller 4. On the contrary, data acquired by the communication units 5B and 5C is assumed to be integrated and output from the communication unit 5A.

The corresponding-table 8 illustrated in FIG. 2 is here used, and the conversion-info 30 illustrated in FIG. 3 is used.

Further, for convenience of explanation, description will be made on the premise of the fact that one communication unit 5 has one communication interface 12; however, even if one communication unit 5 has two or more communication interfaces 12, the present invention is applicable.

Specifically, FIG. 8 illustrates a configuration in which data acquired by the communication unit 5A is triple-system data, the communication unit 5B can transmit one-system data, and the communication unit 5C can transmit data divided into two. On the contrary, FIG. 8 illustrates a configuration in which data acquired by the communication units 5B and 5C is integrated and output from the communication unit 5A. This permits the communication device 1 to realize communication with high reliability.

Figure 9:
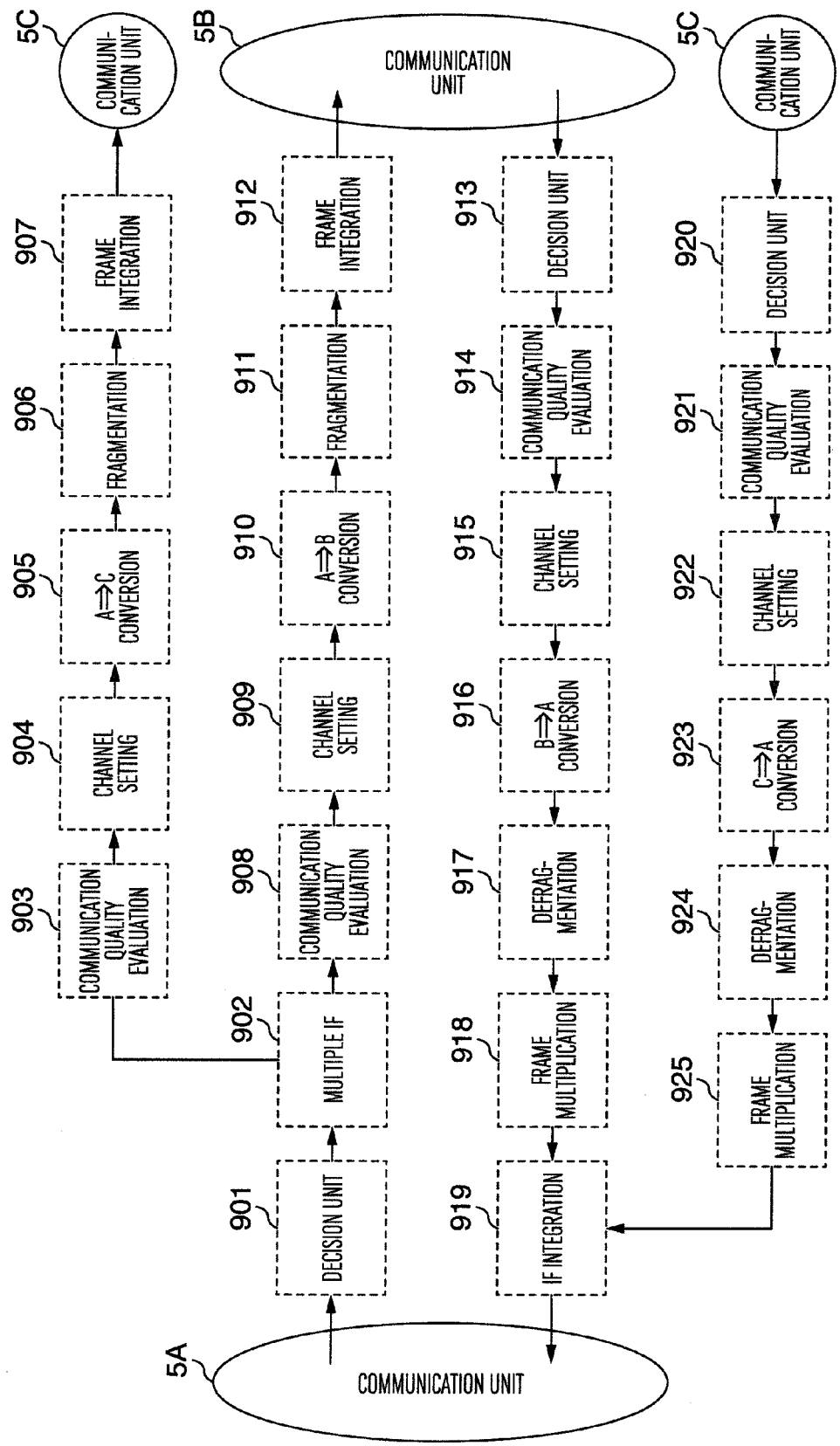
FIG. 9 illustrates one example of data processing of the communication device according to the first embodiment of the present invention.

FIG. 9 illustrates one example of data processing of the communication device according to the first embodiment of the present invention.

Specific process will be described with reference to FIG. 9.

Here, data which passes through the process of the decision unit 9 is produced from the communication unit 5A. Suppose that in step 701, the communication controller 4 decides that data needs to be output to the two or more communication units 5 (step 901).

In this case, in step 702, the communication controller 4 duplicates data for the communication units 5B and 5C.

Next, in step 703, the communication controller 4 adds the conversion-info ID 24 (0x0002) to the data for the communication unit 5B, and the conversion-info ID 24 (0x0001) to the data for the communication unit 5C (step 902).

First, a process flow of the data for the communication unit 5C will be described.

Suppose that in step 704, evaluation of the quality of communication is decided to be required. Next, in step 705, the communication controller 4 decides whether all the necessary data is prepared. If all the necessary data is prepared, the communication controller 4 performs the evaluation of the quality of communication (step 903).

Figures 10, 11:
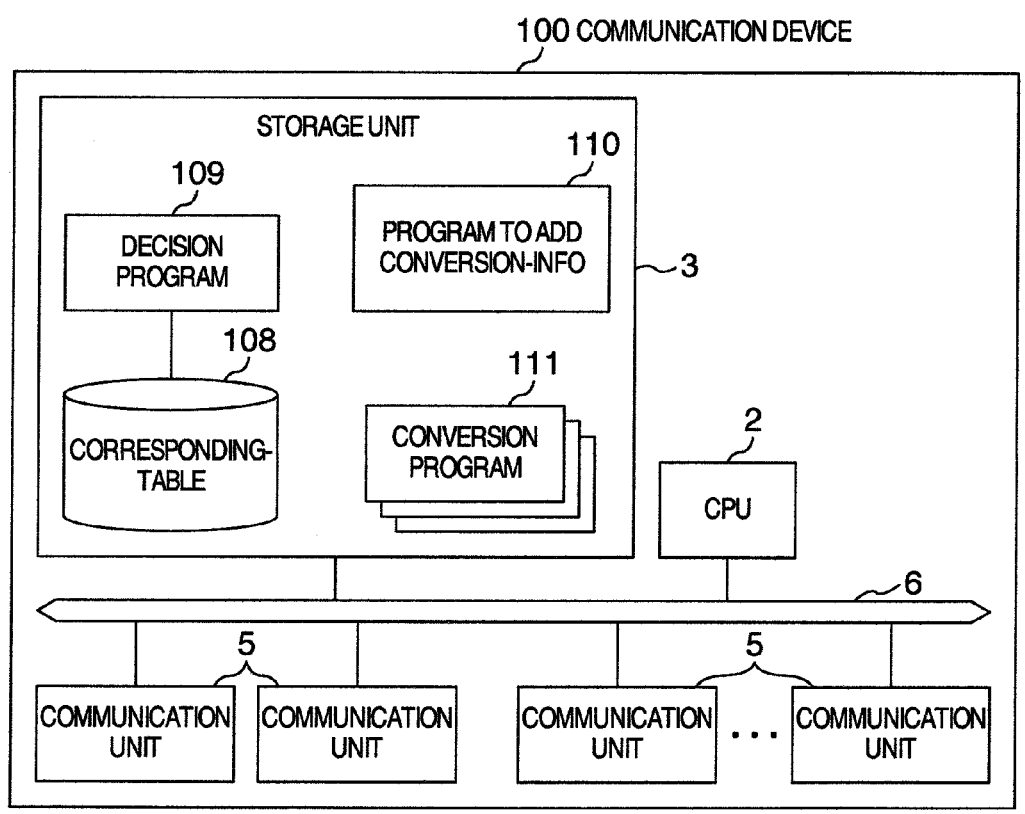
FIG. 10 illustrates one example in which information of quality is associated with an evaluation method of quality of communication according to the first embodiment of the present invention.
FIG. 11 illustrates a configuration example of the communication device according to a second embodiment of the present invention.

FIG. 10 illustrates one example in which information of quality is associated with an evaluation method of the quality of communication according to the first embodiment of the present invention.

As illustrated in FIG. 10, for example, list information to decide the evaluation method of the quality of communication is prepared based on the quality information 34 of the conversion-info 30. Here, there is performed the evaluation method for the received signal strength indicator (RSSI) measurement and the packet error rate (PER) measurement corresponding to information of quality I and information of quality II. In addition, an evaluation method for a bit error rate (BER) measurement corresponding to information of quality III is performed.

Specifically, there is used a process of storing previously-acquired data in a predetermined region at the time when the communication unit 5A communicates with the external device 7, and deciding a channel to be used based on a threshold decision. A parameter such as a threshold used for an evaluation of the quality of communication may be included in the conversion-info 30.

Next, the communication controller 4 returns to step 704 again, and decides that setting processing of the channel of communication is necessary. Subsequently, in step 705, the communication controller 4 decides whether data necessary for the setting processing of the channel of communication is prepared. Here, in step 903 of performing the evaluation of the quality of communication, the data necessary for the setting processing of the channel of communication is assumed to be prepared, and the communication device 1 sets the channel of communication (step 904).

If the necessary data is not prepared, the communication device 1 may set the predetermined channel of communication, or end the setting processing of the channel of communication. For example, when a valid channel number is set in the item (channel information) of the channel of communication of the conversion-info 30, the channel number is used. When the valid channel number is not set, the communication device 1 ends the setting processing.

Next, the communication controller 4 returns to step 704 again, and decides that conversion from a data format of the communication unit 5A to that of the communication unit 5C is required. In the same manner, in step 705, the communication controller 4 decides whether all the necessary data is prepared. If all the necessary data is prepared, the communication controller 4 performs the conversion process (A→C conversion) of the data format (step 905).

Here, information necessary for conversion of the data format is a conversion method of the destination address included in the data. When one type of a network to which the communication unit 5A is connected and another type of a network to which the communication unit 5C is connected are different from each other, there is the possibility that address systems also are different from each other. Therefore, one address usable in the communication unit 5A side needs to be converted into another address usable in the communication unit 5C side.

For example, when one network on the side of the communication unit 5A is based on IPv6, and another network on the side of the communication unit 5C is based on IPv4, an address conversion-table for converting an IPv6 address and an IPv4 address into each other may be prepared.

Next, the communication controller 4 returns to step 704 again, and decides that fragment processing of data is required. Here, the communication device 1 fragments data according to the specified data size (step 906).

For example, when a maximum data payload size of a data part of the communication unit 5C is 100 bytes, and a maximum data payload size of a data part of the communication unit 5A is 300 bytes, the communication device 1 fragments the data part into three, respectively.

When the data size of the data part of the communication unit 5A is 80 bytes, it does not need to be fragmented, and therefore, the communication device 1 moves to the next process. Here, since the fragment processing (step 906) and the conversion process (step 905) of the data format may be related to each other, the communication device 1 may integrate the steps 905 and 906.

Next, the communication controller 4 returns to step 704 again, and decides that integration processing of a data frame is required. For example, when data of the communication unit 5 is tripled, since they are integrated into one and transmitted on the side of the communication unit 5C, the communication device 1 performs the integration processing of the data frame (step 907).

Here, in step 705, until necessary data from the communication unit 5, namely, three multiplied data is prepared, the communication controller 4 waits for them. Further, when the time out occurs, the communication controller 4 ends the process, or integrates only prepared data and continues the process. When contents of two data are the same and content of the other data is different among the tripled data, the communication controller 4 may integrate only two data and discard one different data according to majority processing.

Finally, the communication controller 4 returns to step 704 again, and decides that necessary processing is not left. Therefore, in step 708, the communication controller 4 deletes the conversion-info 30, and then transmits data by using the communication unit 5C in step 709.

Here, the communication controller 4 may perform the retry processing based on the retry number 39 and the retry waiting time 40 included in the conversion-info 30.

As described above, an order of each processing is one example, and an order as illustrated in FIG. 9 does not need to be performed. Unless a trouble is caused as a series of processing, there is no problem even if it is performed in any order. For example, after performing step 901 of the decision unit 9, the communication device 1 may perform step 907 of the frame integration. Alternatively, the communication device 1 may perform step 903 of evaluation of the quality of communication or step 904 of the channel setting after step 907 of the frame integration.

A processing method of data for the communication unit 5B to which the conversion-info ID 24 (0x0002) is added is represented in steps 908 to 912. One process of steps 908 to 912 and another process of steps 903 to 907 are approximately the same, and therefore the description will not be repeated here.

Next, description will be made in detail about a process flow in the case where data is produced from the communication unit 5C, and the conversion-info ID 24 (0x0004) is added after the process of the decision unit 9.

In the same manner as in the above-described process, after completion of step 920 in the decision unit 9, the communication device 1 first performs step 921 of evaluation for the quality of communication and step 922 of the channel setting.

Next, the communication device 1 performs step 923 of converting a data format for the communication unit 5C into a data format for the communication unit 5A.

Next, the communication device 1 performs defragment processing 924 of defragmenting a series of data from the communication unit 5C into one data.

Next, since the data frame is multiplied and transmitted in the communication unit 5A, the communication device 1 performs step 925 of multiplying the frame.

Finally, the communication controller 4 returns to step 704 again, and decides that the communication units 5 needs to be integrated. Subsequently, in step 705, the communication controller 4 decides whether all the necessary data is prepared.

Here, the communication device 1 decides whether processes of steps 913 to 918 are similarly performed with respect to one data from the communication unit 5B and another data from the communication unit 5C.

Only when both of one data from the communication unit 5B and another data from the communication unit 5C are prepared, the communication device 1 may continue the process. Even if one data is not prepared, the communication device 1 may continue the process after a lapse of a prescribed time.

When contents of the integrated data are different on the sides of the communication units 5B and 5C, the communication device 1 may transmit data resulting from connecting both the data from the communication unit 5A side.

Step 19 is a process of integration (IF integration) of the communication units.

According to the present embodiment, a configuration in which three types of the communication units 5A, 5B, and 5C are connected is described specifically, and the number of the communication units 5 and a type thereof can be realized by using an arbitrary configuration.

Further, addition or deletion of the communication unit 5 can be performed on the way.

For example, a process in the case where a new communication unit 5D is added will be described.

When the new communication unit 5D is added, the corresponding-table 8 between the existing communication units 5A, 5B, and 5C, and the newly-added communication unit 5D, the conversion-info 30, and the conversion unit 11 are newly required.

To cope with the above, a method for adding and updating the corresponding-table 8, the conversion-info 30, and the conversion unit 11 will be described in detail.

By the same function as that of plug and play of USB, for example, the CPU 2 can know that the communication unit 5D is newly added.

The CPU 2 acquires the corresponding-table 8 and conversion-info 30 for the communication unit 5D via a memory or the existing communication units 5A, 5B, or 5C from the outside.

When having an information storage unit such as a memory, the communication unit 5D may acquire information therefrom.

The conversion unit 11 can realize the addition and update, for example, by update of a microprogram.

With regard to the above-described process, the communication controller 4 may perform a role of the CPU 2.

As described above, according to the present embodiment, the communication device 1 having two or more different communication units 5 can fast process transmission and reception of data between a certain communication unit 5 and a communication unit 5 different therefrom by executing parallel operations for each data.

Further, the communication device 1 having an arbitrary communication unit 5 is configured by the update of the corresponding-table 8, and can easily realize communication between different networks.

Further, the communication device 1 can prevent a processing speed from being reduced at the time when multiple types of communication are made common.

In addition, also when a type of corresponding communication interface increases, the communication device 1 can respond to a mutual communication between all of different communication interfaces by efficiently using existing assets.

Second Embodiment

A second embodiment of the present invention will be described in detail below with reference to the accompanying drawings.

FIG. 11 illustrates a configuration example of the communication device according to the second embodiment of the present invention.

The communication device 100 includes the CPU 2, the storage unit 3, and the communication units 5.

In the same manner as in the first embodiment, the CPU 2, the storage unit 3, and the communication units 5 are connected to each other by the bus 6 of parallel connection or serial connection. The storage unit 3 and the CPU 2 may be directly connected to each other without the bus 6.

In the same manner as in the first embodiment, the CPU 2 has a function of reading out a program from the storage unit 3 and executing it and a function of transmitting and receiving data to and from the communication units 5.

Also, the storage unit 3 has the same function as in the first embodiment, and internally has a corresponding-table 108, a decision program 109, a program to add conversion-info 110, and a conversion program 111.

The communication unit 5 also has the same function as in the first embodiment, and each has a communication interface. In FIG. 11, the description will not be repeated here.

In the corresponding-table 108, the decision program 109, the program to add conversion-info 110, and the conversion program 111, functions of the corresponding-table 8, decision unit 9, unit to add conversion-info 10, and conversion unit 11 according to the first embodiment are realized by software, respectively.

Accordingly, in the second embodiment, when calling for each program of the storage unit 3, the CPU 2 transmits and receives data between different communication units by the same process flow as that of the communication controller 4 according to the first embodiment.

When executing parallel operations, for example, by performing a multi task, the conversion program 111 processes data from two or more communication units 5 at the same time. A specific process procedure is described in the same manner as in the first embodiment, and therefore the description will not be repeated here.

Further, when a new communication unit 5 is added to the communication device 100, the corresponding-table 108 of the storage unit 3 is updated or the conversion program 111 is added, thereby establishing connection between the existing communication units 5 and the newly-added communication unit 5.

As described above, according to the second embodiment, the communication device 100 having two or more different communication units 5 can fast process the data transmission and reception between the different communication units 5 by executing parallel operations for each data.

Further, by the addition and update of the corresponding-table 108 and the conversion program 111, the communication device 100 having arbitrary communication units 5 is configured, and can easily realize communication between different networks.

Third Embodiment

A third embodiment of the present invention will be described in detail below with reference to the accompanying drawings.

Figure 12:
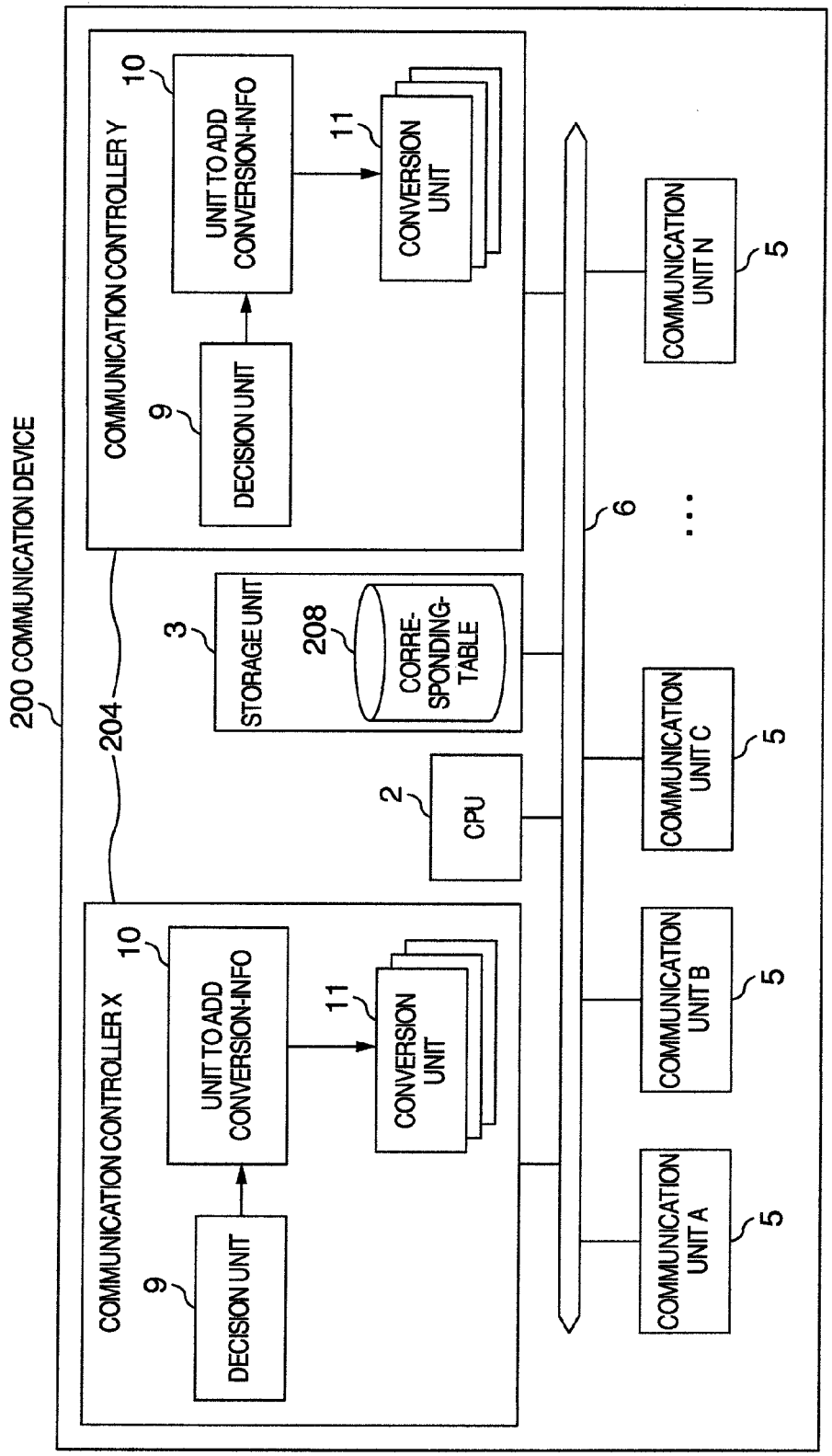
FIG. 12 illustrates a configuration example of the communication device according to a third embodiment of the present invention.

FIG. 12 illustrates a configuration example of the communication device according to the third embodiment of the present invention.

The illustrated communication device 200 includes the CPU 2, the storage unit 3, two or more communication controllers 204, and the communication units 5.

In the same manner as in the first embodiment, the CPU 2, the storage unit 3, the communication controllers 204, and the communication units 5 are connected to each other via the bus 6 of parallel connection or serial connection. The storage unit 3 and the CPU 2 may be directly connected to each other without the bus 6.

The CPU 2 has the same function as in the first embodiment.

The storage unit 3 also has the same function as in the first embodiment, and further internally has a corresponding-table 208.

The communication unit 5 also has the same function as in the first embodiment, and each has the communication interface 12. In FIG. 12, the description will not be repeated.

The communication controller 204 has the same function as that of the communication controller 4 according to the first embodiment. The communication controller 204 further has the decision unit 9, the unit to add conversion-info 10, and the conversion unit 11; however, has no corresponding-table 8.

Further, the communication controller 204 has a function of accessing a corresponding-table 208 of the storage unit 3 via the bus 6.

The storage unit 3 may have the corresponding-table for the two or more communication controllers 204, or only the corresponding-table for a part of the communication controllers 204.

Subsequently, the description will be made assuming, as one example, that the communication device 200 has the two communication controllers 204X and 204Y, and three types of the communication units 5A, 5B, and 5C.

Further, the communication controller 204X is assumed to be able to treat data for the communication units 5A and 5B, and the communication controller 204Y is assumed to be able to treat data for the communication units 5B and 5C.

FIG. 13 illustrates one example of a configuration of the corresponding-table according to the third embodiment of the present invention.

FIG. 13A illustrates an example of the corresponding-table 208 for the communication controller 204X, and FIG. 13B illustrates an example of the corresponding-table 208 for the communication controller 204Y.

Figure 14:
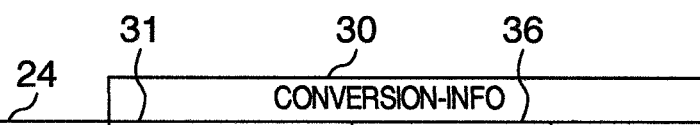
FIG. 14 illustrates one example of a configuration of the conversion-info according to the third embodiment of the present invention.

FIG. 14 illustrates one example of a configuration of the conversion-info according to the third embodiment of the present invention.

FIG. 14 illustrates the conversion-info 30 corresponding to each conversion-info ID 24.

In FIG. 14, the output IF 31 and the conversion pattern 36 are clearly described as the conversion-info 30; further, it is assumed to practically have other information as in the first embodiment.

Figure 15:
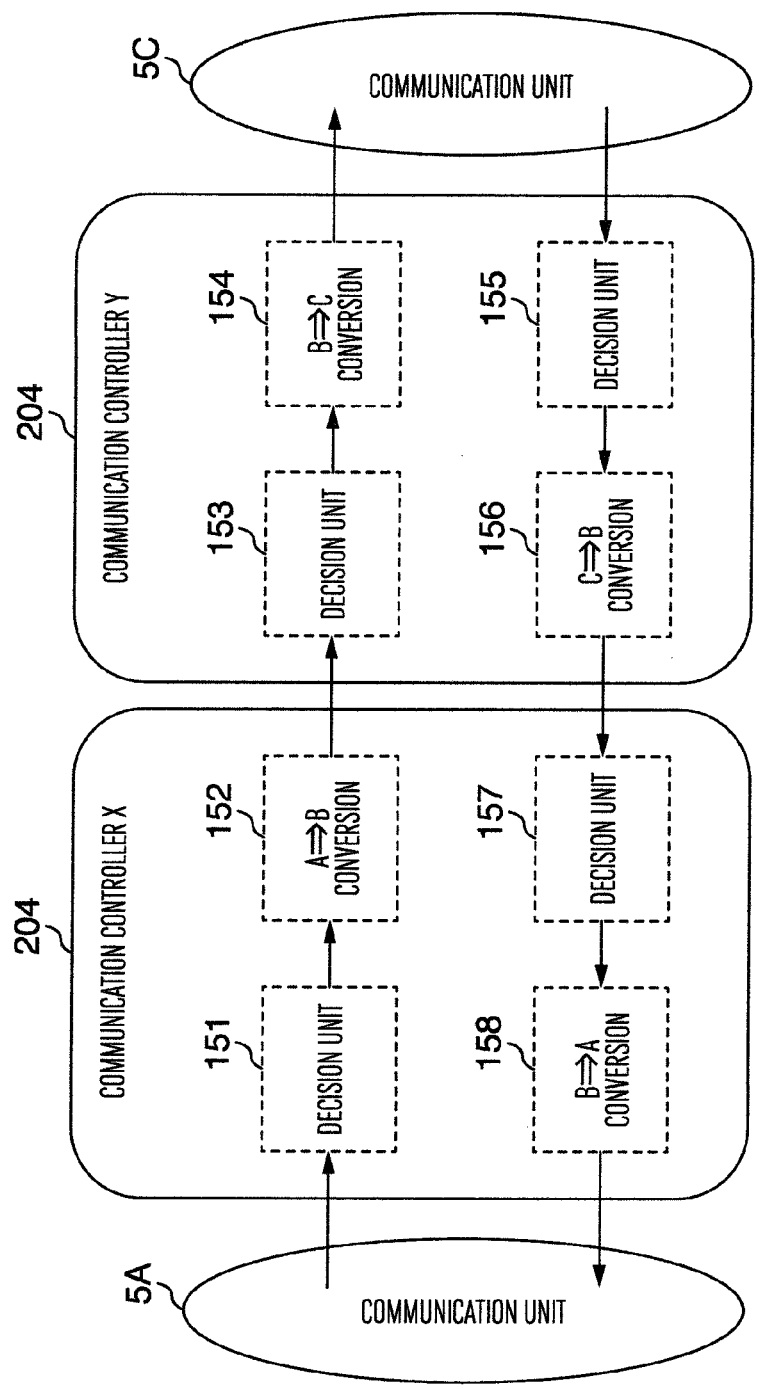
FIG. 15 illustrates one example of data processing of the communication device according to the third embodiment of the present invention.

FIG. 15 illustrates one example of data processing of the communication device according to the third embodiment of the present invention.

One example of the data processing according to the third embodiment is illustrated by using FIG. 15.

Suppose, first, that the communication controller 204X acquires data from the communication unit 5A.

Next, the decision unit 9 executes a process in the same manner as in the process of the decision unit 9 according to the first embodiment, and acquires the corresponding conversion-info ID 24 and conversion-info 30 from the corresponding-table 208. Here, 0x0011 is assumed to be acquired as the conversion-info ID 24 (step 151).

Next, the conversion unit 11 executes the process in order in the same manner as in the first embodiment. Here, the conversion unit 11 converts data for the communication unit 5A into data for the communication unit 5B, and transmits it to the communication controller 204Y (step 152).

The communication controller 204Y acquires data from the communication controller 204X, and the decision unit 9 acquires 0x0102 as the conversion-info ID 24 from the corresponding-table 208 (step 153).

Next, the conversion unit 11 executes the process in order based on the acquired conversion-info 30. Here, the conversion unit 11 converts data for the communication unit 5B into data for the communication unit 5C, and transmits it to the communication unit 5C (step 154).

Also when acquiring data from the communication unit 5C, the communication controller 204Y similarly transmits it to the communication unit 5A via steps 155 to 158.

As described above, even if a type of the communication unit 5 is increased, when using the two or more existing communication controllers 204 in combination thereof, the communication device 200 according to the third embodiment can realize transmission and reception of data between the respective communication units 5 without adding new hardware.

Fourth Embodiment

A fourth embodiment of the present invention will be described in detail below with reference to the accompanying drawings.

Figure 16:
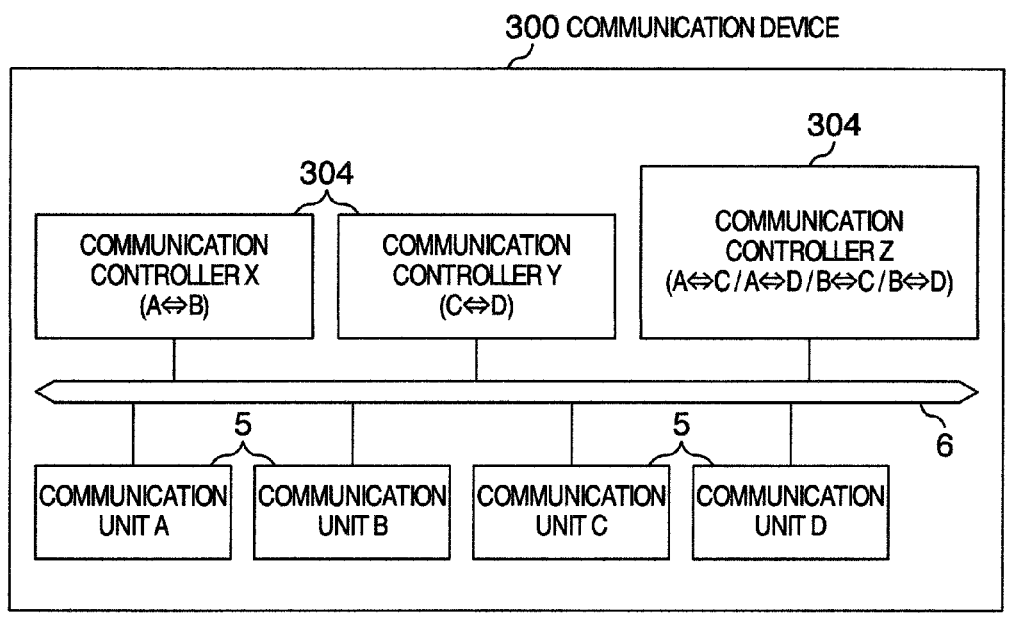
FIG. 16 illustrates a configuration example of the communication device according to a fourth embodiment of the present invention.

FIG. 16 illustrates a configuration example of the communication device according to the fourth embodiment of the present invention.

The illustrated communication device 300 includes two or more communication controllers 304 and communication units 5.

In the same manner as in the first embodiment, the communication controllers 304 and the communication units 5 are connected to each other via the bus 6 of parallel connection or serial connection.

Further, in the same manner as in the first embodiment, the CPU 2 and the storage unit 3 may be connected to the bus 6.

The communication controller 304 has the same function as in the first or third embodiment, and may have the corresponding-table by itself. When the storage unit 3 is connected to the bus 6, the communication controller 304 may cause the storage unit 3 to have the corresponding-table, and access it via the bus 6.

One example of the data processing according to the fourth embodiment will be described below.

In the fourth embodiment, the communication device 300 is assumed to have four types of communication units 5A to 5D, and three types of communication controllers 304X, 304Y, and 304Z.

Further, the communication controller 304X is assumed to have a function of treating data to and from the communication units 5A and 5B, and the communication controller 304Y is assumed to have a function of treating data to and from the communication units 5C and 5D.

Further, the communication controller 304Z is assumed to have at least any one of the following functions.

Specifically, the communication controller 304Z has at least any one of functions of treating data to and from the communication units 5A and 5C, treating data to and from the communication units 5A and 5D, treating data to and from the communication units 5B and 5C, treating data to and from the communication units 5B and 5D, and treating data of any three types of communication units 5 among the communication units 5A to 5D. Here, the communication controller 304Z is assumed to have a function of treating data to and from the communication units 5B and 5C.

In the communication device 300, when the communication unit 5D desires to transmit data acquired by the communication unit 5A, the communication controller 304X first converts data for the communication unit 5A into data for the communication unit 5B.

Next, the communication controller 304Z converts data for the communication unit 5B into data for the communication unit 5C, and transmits it to the communication controller 304Y.

Finally, the communication controller 304Y may convert data for the communication unit 5C into data for the communication unit 5D, and transmit it to the communication unit 5D.

As can be seen from the above discussion, six types of data conversion units are required in order to mutually transmit and receive data between four types of the communication units 5. When three types of the data conversion units are used, the communication device 300 can respond to all combinations of communication.

As described above, even when types of the communication units 5 are increased, even if hardware and software corresponding to all combinations are not prepared in the data conversion between different communication units 5, the communication device 300 according to the fourth embodiment can respond to all the combinations by appropriately combining two or more communication controllers 304.

Fifth Embodiment

A fifth embodiment of the present invention will be described in detail below with reference to the accompanying drawings.

Figure 17:
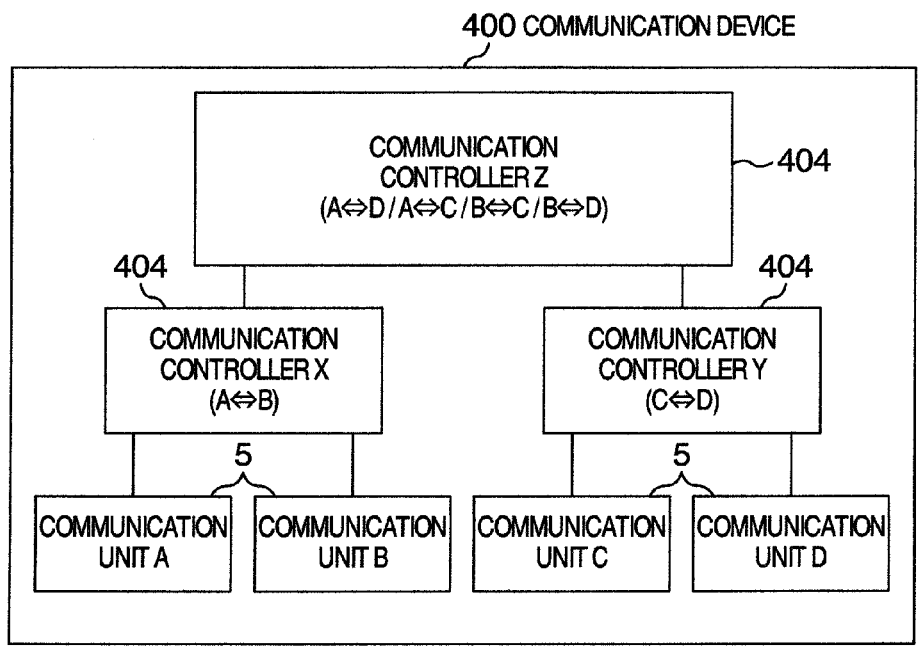
FIG. 17 illustrates a configuration example of the communication device according to a fifth embodiment of the present invention.

FIG. 17 illustrates a configuration example of the communication device according to the fifth embodiment of the present invention.

The illustrated communication device 400 includes two or more communication controllers 404 and communication units 5.

In the same manner as in the first embodiment, the communication controllers 404 and the communication units 5 may be connected to each other via the bus 6 of parallel connection or serial connection, and directly connected to each other as in FIG. 17.

The communication controller 404 has the same function as in the first or third embodiment, and may have the corresponding-table by itself. When the storage unit 3 is externally connected, the communication controller 304 may cause the storage unit 3 to have the corresponding-table.

Further, the communication controller 404 has a function of directly transmitting and receiving data to and from the communication units 5 or the other communication controllers 404.

One example of the data processing according to the fifth embodiment will be described below.

In the fifth embodiment, the communication device 400 is assumed to have four types of communication units 5A to 5D, and three types of communication controllers 404X, 404Y, and 404Z.

Suppose, further, that the communication controller 404X is connected to the communication units 5A and 5B, and has a function of treating data thereto and therefrom. Similarly, suppose that the communication controller 404Y is connected to the communication units 5C and 5D, and has a function of treating data thereto and therefrom.

Suppose, on the other hand, that the communication controller 304Z is connected to the communication controllers 404X and 404Y, and has at least any one of the following functions.

Specifically, the communication controller 304Z has at least any one of functions of treating data to and from the communication units 5A and 5C, treating data to and from the communication units 5A and 5D, treating data to and from the communication units 5B and 5C, treating data to and from the communication units 5B and 5D, and treating data of any three types of communication units 5 among the communication units 5A to 5D. Here, the communication controller 404Z is assumed to have a function of treating data to and from the communication units 5A and 5C.

In the communication device 400, when the communication unit 5C desires to transmit data acquired by the communication unit 5A, the communication controller 404X first transmits the acquired data directly to the communication controller 404Z.

Next, the communication controller 404Z converts data for the communication unit 5A into data for the communication unit 5C, and transmits it to the communication controller 404Y.

Finally, the communication controller 404Y may directly transmit data to the communication unit C.

As can be seen from the above discussion, in the same manner as in the fourth embodiment, six types of data conversion units are required in order to mutually transmit and receive data between four types of the communication units 5. When three types of the data conversion units are used, the communication device 400 can respond to all combinations of communication.

As described above, also when types of the communication units 5 are increased, even if hardware and software corresponding to all combinations are not prepared in the data conversion between different communication units 5, the communication device 400 according to the fifth embodiment can respond to all the combinations by appropriately combining the two or more communication controllers 404.

The present invention is available for a communication device used in a communication system such as Internet/Intranet, wireless LAN, cellular phone, sensor network, and RFID.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication device comprising a plurality of communication units, each of which communicates with a plurality of external devices, and a calculation processing unit for transmitting or receiving communication data with the plurality of communication units, the communication device further comprising a communication controller for converting data format of communication data to be exchanged between the calculation processing unit and the communication unit into the corresponding data format to each of the communication units, wherein:
the communication controller is arranged to include:
1) a table unit for storing information on a corresponding-table among a communication path, a type of the communication unit and conversion information,
2) decision unit for deciding the communication path and the type of the communication unit, wherein the communication controller has table information that associates the communication path, and
3) conversion unit for converting the data format of data into the corresponding data format in accordance with both result at the decision unit and the conversion information having been stored in the table unit, wherein:
the conversion information having been stored in the table unit indicates that the communication data received from the communication units are to be duplicated and transmitted to the other communication unit, and wherein:
the conversion unit is arranged to duplicate the received communication data in accordance with the conversion information corresponding to the received communication data;
wherein:
the conversion information having been stored in the table unit further indicates that the communication data received from the communication units are to be unified and transmitted to the other communication unit, and wherein:
the conversion unit is further arranged to unify the received communication data in accordance with the conversion information corresponding to the received communication data.

2. The communication device according to claim 1, wherein:
the conversion information having been stored in the table unit further indicates that the communication data received from the communication units are to be multiplexed and transmitted to the other communication unit, and wherein:
the conversion unit is further arranged to multiplex the received communication data in accordance with the conversion information corresponding to the received communication data.

3. The communication device according to claim 1, wherein:
the decision unit extracts at least a part of data acquired by the communication unit in a format corresponding to a type of the communication unit, and parallelizes the extracted data.

4. The communication device according to claim 1, wherein:
when another communication unit is newly connected, the another communication unit has own conversion information, and updates the table information based on the own conversion information.

5. The communication device according to claim 1, wherein:
when another communication unit is newly connected, conversion information to connect the previously-connected communication unit and the another communication unit to each other is acquired from the external devices via the communication unit, and the table information is updated based on the acquired conversion information.

6. The communication device according to claim 1, wherein:
plural ones of the communication controller are provided, each of the communication units and each of the communication controllers is connected with each other through a bus, the information in the table unit is arranged to coordinate different types of the communication paths, each of the communication units and conversion information with each other, and wherein:
communication data are received/transmitted among each of the communication units by processing communication data having been acquired at the communication unit through one of the communication controller.

* * * * *